United States Patent
Grivas

[11] 3,761,489
[45] Sept. 25, 1973

[54] SUBSTITUTED N-ALKYL BENZISOTHIAZOLINONES

[75] Inventor: John C. Grivas, South Holland, Ill.

[73] Assignee: The Sherwin-Williams Company, Cleveland, Ohio

[22] Filed: Dec. 20, 1971

[21] Appl. No.: 210,198

Related U.S. Application Data

[63] Continuation-in-part of Ser. No. 199,007, Nov. 15, 1971.

[52] U.S. Cl. .................................. 260/304, 106/15
[51] Int. Cl. ............................................ C07d 91/10
[58] Field of Search .................................. 260/304

[56] References Cited
FOREIGN PATENTS OR APPLICATIONS
976,028   11/1964   Great Britain ...................... 260/304

*Primary Examiner*—R. J. Gallagher
*Attorney*—Lowell G. Wise

[57] ABSTRACT

A novel class of benzisothiazolinones having the structural formula:

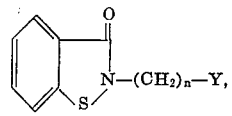

where $n$ is 1 or 2 and Y is selected from —CN, —SCN,

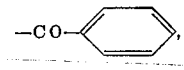

and

—CH(OCH$_3$)$_2$. These compounds are useful as microbiocides, particularly for control of fungi.

6 Claims, No Drawings

SUBSTITUTED N-ALKYL BENZISOTHIAZOLINONES

REFERENCE TO COPENDING APPLICATION

This application is a continuation-in-part of U.S. Pat. Application Ser. No. 199,007, filed Nov. 15, 1971.

BACKGROUND OF THE INVENTION

Benzisothiazolinones are heterocyclic compounds having as their parent structure the formula:

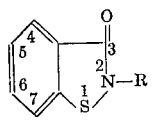

N-substituted benzisothiazolinones are known to have many beneficial biological uses. These compounds are microbiocides useful for control of various microorganisms, including bacteria, fungi, yeasts, etc. Therapeutic uses of these compounds are also known. These compounds have utility as materials for use in investigating biological activity in plants and animals.

One valuable use of benzisothiazolinones has been found in control of mildew on organic coating surfaces, particularly exterior painted areas.

Mildew attack has been a continuing problem in numerous environments where the conditions of humidity and temperature are conductive to the growth of various microbial life. Most climates provide sufficient environment for growth of fungi on organic nutrient surfaces, such as plants, fibers, and coatings. One area which has received great attention is the preventing of mildew fungus growth on exterior organic coatings, especially outside building paints. These paints are applied for protective and decorative purposes over various substrates, usually wood, metal, concrete or ceramics. Painting and repainting of wood structures in houses and other buildings consumes manpower and materials in great amounts. The blemishing and deteriorating effects of various fungi on exterior coatings resulSubt in enormous maintainance problems. Because most paints are applied by brushing or spraying a liquid coating composition onto the surface, the most common method of preventing mildew is to include in the liquid a fungicidally effective amount of chemicals which kill the fungi responsible for the mildew growth.

Mildew growth on exterior organic coatings is attributed to several fungi. The relative importance of different species of fungi is climatically dependent; but, Pullularia species usually account for the major number of fungus colonies on painted surfaces in the United States. This species amounts to more than half the growth on exterior paint surfaces. In the warmer moist areas, Alternaria species, Cladosporium species, and Penicillium species are secondary causes of discoloration. In the northern climates Aspergillus species also is a secondary mildew fungus.

The preferred method for controlling mildew growth on exterior coatings is to incorporate antifungal compositions into the liquid coating material before application to the substrate. In order to achieve uniform distribution of the antifungal additives, the mixing should be performed as an industrial operation, rather than adding the fungicide in the field. For this reason chemical compatibility of the fungicide with the liquid material is important. Many fungicides lose their fungicidal activity prior to being applied in a film. This is particularly significant in latex liquid paints, which are usually alkaline. Thus, container storage life is an important criterion for selecting a paint fungicide. While small amounts of biologically active compounds may prevent deterioration of film-forming materials by anaerobic micro-organisms in a sealed can, the most important function of paint fungicides is the prevention of mildew on a nutrient surface exposed to ambient air. The weathering environment to which most exterior coatings are exposed proves to be detrimental to the biological activity of many chemical compounds.

Other chemical and physical properties to be considered for fungicide additives include animal toxicity, color, solubility (especially in water), film permeability, volatility and odor. Mercury compounds, such as phenyl mercuric phthalate, are effective against some fungi, but harmful to humans and do not prove dependable under field conditions. Dark materials, such as cuprous oxide, cannot be used in light-colored films. Many sulfur-containing compounds, for instance mercaptans, give an unpleasant or noxious odor to the coatings. Nitrogenous compounds often interfere with drying properties of oil paints. If a fungicide is too water soluble, it may be leached from the film by condensed moisture or precipitation. If the fungicide does not migrate through the coating film, it may remain buried below the paint surface and be ineffective.

BRIEF SUMMARY OF THE INVENTION

A novel class of N-substituted benzisothiazolinones has been discovered. This class has an ω-substituted 2-(lower) alkyl group, according to the structural formula:

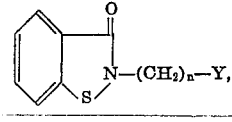

where $n$ is 1 or 2 and where $Y$ is selected from the group consisting of —CN, —SCN,

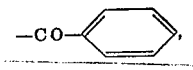

and —CH(OCH$_3$)$_2$. These compounds are useful as antimicrobial agents.

DESCRIPTION OF THE PREFERRED EMBODIMENTS

The synthesis route for making N-substituted benzisothiazolinones depends upon the particular product desired. There are several known synthetic processes for making this class of compounds. Typical processes are described in U. S. Pat. Nos. 3,012,039, 3,065,123 and 3,227,715; in W. German Auslegeschrift No. 1,135,468; in Arzneimittel. Forscn., 14(12), 1301–6 (1964), and in Farmaco, Ed. Sci., 23(11), 1075–80 (1968).

One such synthesis involves the reaction of disulfides with thionyl chloride:

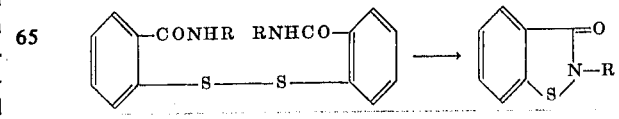

One of the preferred methods for making N-substituted benzisothiazolinones is by the following reaction sequence:

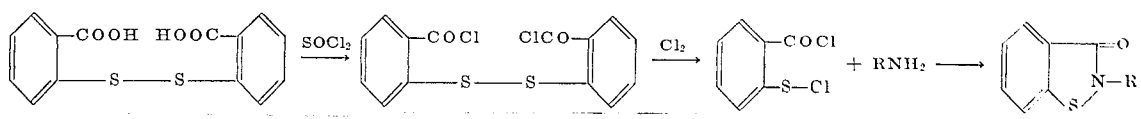

Other reactions useful in preparing the novel compounds include the displacement of one functional group on the alkyl chain by another. For instance, the N-haloalkyl benzisothiazolinones may be reacted with an alkali metal cyanide salt according to the reaction:

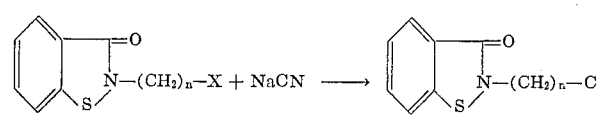

The following examples are given as representative of the invention, but the inventive concept is not limited to such examples. Units are expressed as parts by weight unless otherwise stated.

EXAMPLE 1

2-Cyanomethyl-1,2-benzisothiazolin-3-one

Through a suspension of 220 parts 2,2'-dithiodibenzoyl chloride (0.64 mol) in about 1,040 parts of carbon tetrachloride at 25°–30° C., dry chlorine is bubbled until practically no solid is left in suspension. The solution of o-chlorothiobenzoyl chloride obtained is then clarified by gravity filtration and added incrementally with cooling to a stirred solution of 10.1 parts freshly prepared aminoacetonitrile (0.18 mol) in about 320 parts of pyridine at ambient temperature. The reaction mixture is stirred at ambient temperature for about 2 hours, filtered, washed with cold water, and refiltered. The carbon tetrachloride layer is then separated and evaporated to dryness under reduced pressure to yield 68 parts of crude product, m.p. 140°–143.5° C. Further purification by crystallization from a benzene/hexane mixture and from benzene gives the pure compound, m.p. 143°–145° C.

Analysis:
 Calculated for $C_9H_6N_2OS$: C, 56.82; H, 3,17; N, 14.72; S, 16.85
 Found: C, 56.94; H, 3.28; N, 14.52; S, 16.74
The structure is

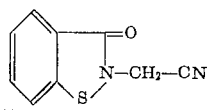

EXAMPLE 2

2-Phenacyl-1,2-benzisothiazolin-3-one

A solution of 89 parts o-chlorothiobenzoyl chloride (0.43 mol) prepared as in Example 1 is added simultaneously with 10 parts sodium hydroxide (0.47 mol) in 50 parts water to a stirred solution of 80 parts aminoacetophenone hydrochloride (0.47 mol) in 1,000 parts water at temperature maintained below about 10° C. The precipitated solid is purified by crystallization from benzene to yield 52 parts of product, m.p. 156°–158° C.
Analysis:
Calculated for $C_{15}H_{11}NO_2S$: C, 66.89; H, 4.12; N, 5.20; S, 11.90
 Found: C, 66.91; H, 4.29; N, 5.14; S, 12.13
The structure is

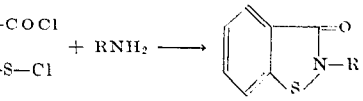

EXAMPLE 3

2-(2-Cyanoethyl)-1,2-benzisothiazolin-3-one

A mixture of 107 parts 2-(2-chloroethyl)-1,2-benzisothiazolin-3-one (0.5 mol), 49 parts sodium cyanide (1.0 mol), and 15 parts sodium iodide (0.01 mol) in about 1,600 parts acetone is refluxed for about 16 hours and filtered hot. The filtrate is cooled to precipitate 58 parts of product, which is purified by recrystallization from acetone, m.p. 158°–159° C.

Analysis:
 Calculated for $C_{10}H_8N_2OS$: C, 58.80; H, 3.95; N, 13.72; S, 15.70
 Found: C, 58.83; H, 3.96; N, 13.76; S, 15.60
The structure is

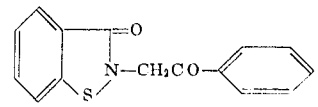

EXAMPLE 4

2-(2-Thiocyanoethyl)-1,2-benzisothiazolin-3-one

A mixture of 166 parts 2-(2-hydroxyethyl)-1,2-benzisothiazolin-3-one p-toluenesulfonate ester (0.47 mol) and 52 parts potassium thiocyanate (0.53 mol) in about 400 parts ethanol is refluxed for 6 hours and evaporated in vacuo to dryness. The solid is washed 3 times in 1,000 parts water, filtered off and dried to yield 98 parts crude product. The compound is purified by crystallization from acetone/hexane mixture, m.p. 102°–103° C.

Analysis:
 Calculated for $C_{10}H_8N_2OS_2$: C, 50.82; H, 3.41; N, 11.86; S, 27.14
 Found: C, 50.62; H, 3.37; N, 11.74; S, 26.93
The structure is

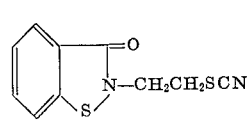

EXAMPLE 5

2-(2,2-dimethoxyethyl)-1,2-benzisothiazolin-3-one

Dry chlorine is bubbled through a suspension of 343 parts 2,2'-dithiodibenzoyl chloride (1.0 mol) in 1,600 parts carbon tetrachloride at room temperature until a clear solution is obtained. Excess chlorine is removed under vacuum at 25°–30° C. The filtered solution is added incrementally to a vigorously agitated solution of 205 parts aminoacetaldehyde dimethyl acetal (1.95 mol, $H_2N-CH_2-CH(OCH_3)_2$) in 980 parts pyridine while maintaining the reaction temperature at 25°–30° C. with cooling. The mixture is allowed to stand overnight and then is poured into about 2,000 parts of ice-water. The carbon tetrachloride phase is separated from the aqueous phase, which is washed twice with 4,000 parts carbon tetrachloride. The washings are combined with the organic phase and dried over anhydrous calcium sulfate. After evaporation under vacuum 269 parts of crude syrup are obtained. The crude is crystallized from hexane to yield 220 parts of pale yellow crystalline compound, m.p. 53.5°–55.5° C.

Analysis:

Calculated for $C_{11}H_{13}NO_3S$: C, 55.21; H, 5.47; N, 5.85; S, 13.40

Found: C, 54.95; H, 5.51; N, 6.08; S, 13.65

The structure is

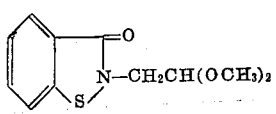

The assigned structures are confirmed by infrared and nuclear magnetic resonance studies.

MICROBIOLOGICAL ACTIVITIES SERIAL DILUTION TESTS

The intrinsic fungicidal activity of the substituted-alkyl benzisothiazolinones compounds has been investigated to determine the minimum inhibitory concentration in vitro against *Pullularia pullulans* (P.p.) and *Penicillium oxalium* (P.o.). The samples were dissolved in a small quantity of organic solvent and made to volume with sterile Sabouraud Liquid Medium. The samples were made to various concentrations in the nutrient medium by the serial dilution technique. These were inoculated with P.p. or P.o. fungi species and incubated for 7 days at 25° C. The results showed a minimum concentration against Pullularia species to be from about one to 500 parts per million for the various compounds tested. These inhibitory amounts compare favorably with commercially available paint fungicides.

In Table I the rsults of the serial dilution tests are set forth for the compounds described in Examples 1 to 5.

TABLE I

Serial Dilution

| Ex. No. | Substituent | Minimum | Concentration |
|---|---|---|---|

| | Radical | Inhibitory P.p. | P.o. |
|---|---|---|---|
| 1 | cyanomethyl | 64 | – |
| 2 | phenacyl | 128 | – |
| 3 | cyanoethyl | 500 | – |
| 4 | thiocyanoethyl | 16 | – |
| 5 | 2,2-dimethoxyethyl | 16 | 1 |
| captan control | | 8 | – |

While the invention has been described by specific examples, there is no intent to limit the inventive concept except as set forth in the following claims.

What is claimed is:

1. A compound having the structure:

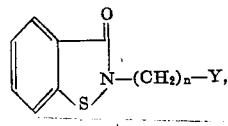

where $n$ is 1 or 2 and where $Y$ is selected from —CN, —SCN,

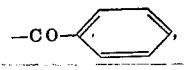

and —CH(OCH$_3$)$_2$.

2. A compound according to claim 1 wherein $n$ is 1 and $Y$ is —CN.

3. A compound according to claim 1 wherein $n$ is 2 and $Y$ is —CN.

4. A compound according to claim 1 wherein $n$ is 1 and $Y$ is

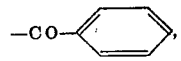

5. A compound according to claim 1 wherein $n$ is 2 and $Y$ is —SCN.

6. A compound according to claim 1 wherein $n$ is 1 and $Y$ is —CH(OCH$_3$)$_2$.

* * * * *